(12) United States Patent
Bennett (10) Patent No.: US 7,893,564 B2
(45) Date of Patent: Feb. 22, 2011

(54) PHASED ARRAY WIRELESS RESONANT POWER DELIVERY SYSTEM

(75) Inventor: James D. Bennett, Hroznetin (CZ)

(73) Assignee: Broadcom Corporation, Irvine, CA (US)

( * ) Notice: Subject to any disclaimer, the term of this patent is extended or adjusted under 35 U.S.C. 154(b) by 365 days.

(21) Appl. No.: 12/241,279

(22) Filed: Sep. 30, 2008

(65) Prior Publication Data
US 2010/0033021 A1 Feb. 11, 2010

Related U.S. Application Data

(60) Provisional application No. 61/086,387, filed on Aug. 5, 2008.

(51) Int. Cl.
*H01F 27/42* (2006.01)
*H02J 7/00* (2006.01)
(52) U.S. Cl. .................................... 307/104; 320/108
(58) Field of Classification Search ................ 307/104; 320/108
See application file for complete search history.

(56) References Cited

U.S. PATENT DOCUMENTS

| | | | |
|---|---|---|---|
| 6,570,541 B2 * | 5/2003 | Dettloff | 343/742 |
| 7,521,890 B2 * | 4/2009 | Lee et al. | 320/108 |
| 2007/0182367 A1 * | 8/2007 | Partovi | 320/108 |
| 2008/0116847 A1 * | 5/2008 | Loke et al. | 320/108 |

* cited by examiner

*Primary Examiner*—Michael Rutland Wallis
(74) *Attorney, Agent, or Firm*—Garlick Harrison & Markison; Bruce E. Garlick (57) ABSTRACT

A resonant power transmission system for wirelessly delivering electric power to a target device. A transmitter resonant phased array includes a power source operable to source alternating current power at a target frequency. A plurality of transmitting elements, each operable to produce a non-radiated magnetic field, produces a composite non-radiated magnetic field. A plurality of transmitter tuned circuit elements couple the alternating current power to the plurality of transmitting elements. Control circuitry controls the plurality of transmitter tuned circuit elements to direct the composite non-radiated magnetic field toward the target device. Communication circuitry communicates with the target device. The plurality of transmitting elements may be a plurality of coils with the control circuitry individually controlling phase of the non-radiated magnetic fields produced by the plurality of transmitting elements by control of the plurality of transmitter tuned circuit elements. The plurality of coils may be directed mechanically in other embodiments.

20 Claims, 9 Drawing Sheets

PHASED ARRAY WIRELESS RESONANT POWER DELIVERY SYSTEM

CROSS REFERENCE TO PRIORITY APPLICATION

This application claims priority under 35 U.S.C. 119(e) to U.S. Provisional Application Ser. No. 61/086,387, filed Aug. 5, 2008, which is incorporated herein by reference in its entirety for all purposes.

BACKGROUND

1. Technical Field

The present invention relates generally to the wireless charging of a battery powered device; and more particularly to techniques for near field wireless resonance power delivery to a target device.

2. Related Art

All electronic devices require electrical power to operate. Mobile devices such as laptop computers and cell phones typically include a rechargeable battery that is recharged when the device is plugged into a power socket. Rechargeable batteries must be charged from wall power regularly to maintain battery life because rechargeable batteries discharge even when not used. The users of the mobile devices often suffer due to inaccessibility of electrical power for battery charging. In such a situation, the user must carry multiple batteries for continued operation of the mobile device. Requiring a user to carry backup batteries not only incurs the expense of the additional battery but requires transport space and increased transport expense.

Users of mobile devices usually carry power cables so that they can recharge the batteries of their mobile devices. These power cables are often misplaced or lost, inconveniencing the users. Quite often, the power cables are device specific and cannot be used in place of one another. Further, even with a power cable in hand, power sockets may be unavailable. This problem is a particular issue in airports or other public places, which users of the mobile devices frequent. In some critical applications, such as military applications and medical applications, it becomes a dangerous if not disastrous to interfere with an ongoing activity/communication of a mobile device simply to recharge the device's battery.

Near field power delivery has been known for many years. Nikola Tesla first experimented with such power delivery many years ago, although his solutions were not viable for various reasons. Near field power delivery typically exploits magnetically coupled resonance, which allows two objects resonating at the same frequency to exchange energy with moderate efficiency. The frequency of such near field resonance may be much lower than wireless communication frequencies, e.g., 10 MHz for near field resonances compared to 2 GHz for wireless communications. Thus, near field power delivery shows much promise, although it is not yet commercially exploited.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Embodiments of the present invention address battery power charging in-situ from a remote power source (station) wirelessly using radiated/magnetic power or non-radiated magnetic fields. This approach of recharging a battery in remote devices is applicable to fairly long distance between a power source and a target device i.e., a portable electronic target device having rechargeable battery. In some embodiments of the present invention the delivery of power is conducted through relatively high frequency resonant magnetic coupling between a power source and a target device, the target device being an electronic device that runs on a portable rechargeable battery embedded in it. Such high frequency coupling is magnetic coupling in some embodiments but may be Radio Frequency (RF) coupling in other embodiments. Such coupling may be described herein as wireless power transfer, beam forming, RF beaming, or other beaming/power delivery. In typical embodiments of the present invention for wireless power transfer, the power source and the target device are tuned to the same frequency. Such tuning results in magnetic resonance in the target device for power transmitted by the power source, with air as the medium for power transfer.

In accordance with some embodiments of the present invention, the magnetic coupling is directed towards the target device by properly shaping a controllable magnetic generating coil array/antenna array that is powered by an alternating current power source. This system works on a transformer principle but with an air core and coupling across a distance. For example, the system of the present invention may use one or more coils disposed in a floor or ceiling of a room with target devices within the room receiving power. However, coils of the present invention could be disposed in a structure such as a kiosk in a shopping mall or airport, with an operator of the kiosk charging target devices for being charged at the kiosk. Various other installations of the device may be employed according to the teachings described herein.

Magnetic signals/fields created by the power source are received by an antenna/coil of the target device. The received signals/fields charge capacitors through diodes at the target device. An array of such capacitors may be connected in series using a plurality of diodes. This array of capacitors and plurality of diodes helps in rectification of AC (alternating current) to DC (direct current) and may amplifying the DC voltage to a value that is sufficient to charge a battery in the target device. A power/voltage sensing mechanism of the target device helps to control the power/voltage of the signal used to charge the battery, in accordance with the present invention. A low voltage limit/low power level sensing circuitry in the target device initiates a power request to the power source (sometimes referred to as a wireless power station or resonant power transmission system). A high voltage limit/high power level sensing circuit senses the maximum allowable battery voltage or power level during charging. Once the battery is charged to a maximum level, the high voltage sensing circuitry initiates a termination of power delivery, such as by communicating a request for the resonant power transmission system (power station) to cutoff the power, by terminating the wireless transmission of magnetic fields (radiated or non-radiated, as the case may be)/magnetic resonant power transmissions.

Authorization module(s) of the target device and the resonant power transmission system communicate to authenticate the target device for receipt of resonant power from the resonant power transmission system. For example, such authentication is done based on the information that the authorization module shares with the resonant power transmission system. Specifically, in one embodiment, the authentication is conducted based on the comparison of authentication information sent by the authorization module with other information available in an authentication database in the resonant power transmission system.

According to an aspect of the present invention, the resonant power transmission system and the target device communicate with one another via the power delivery signal. These communications may include information relating to the power charging or other information. Because of the strong wireless coupling between the resonant power transmission system and the target device, high data rate communications may be supported by using this technique. For communications from the target device to the resonant power transmission system, the same principle may be employed. However, in some embodiments, communications between the target device and the resonant power transmission system may be supported by other wireless techniques such as Wireless Local Area Network (WLAN) operations, e.g., IEEE 802.11x, Wireless Personal Area Network operations (WPAN) operations, e.g., Bluetooth, infrared communications, cellular communications and/or other techniques.

In accordance with the present invention the efficiency of the power delivery is further enhanced using a plurality of resonating coils arranged in the form of an array called the transmitter resonant phased array. Each of the coils of the resonating circuit is associated with a capacitor for the resonant action. The combination of the coil and capacitor forms tuned circuit that can be tuned to the frequency of a controlled power source. The controlled power source of the present invention is the power source used to generate the coupling magnetic field pattern in the space that couples the resonant power transmission system and the target device magnetically.

The signal from the controlled power source of the present invention is divided among number of ports, equally. The power from the output of these ports is fed to the plurality of the tuned circuits of the transmitter resonant phased array. The number of ports in the power divider is equal to the number of tuned circuits in the transmitter resonant phased array. In accordance with the present invention the phase of the signal fed to each of the tuned circuits is adjusted to compensate for the phase difference among the phases of the signal fed to the plurality of the tuned circuits. This phase compensation is required to account for the path difference of the signal on the wires and the path in free space.

Further the coils of the tuned circuit can be orientated in space to direct their induced magnetic field in the required direction in accordance with the present invention. This is done using a directional controller in the resonant power transmission system. This helps to focus the magnetic field pattern to a single point in space called the focal point. The magnetic field line from different tuned circuit adds vectorially maximizing the field at the focal point. On the target device side the receiving of the power is accomplished using a receiver that may include a resonant phased array having similar tuned circuits as on the transmitter resonant phased array.

In the process of the phasor addition the phase of the each of the received voltages may be compensated so that all the induced voltages have the same amplitude, frequency, and phase. During the phase compensation process the phase of the voltage across the coil from the center of the receiver resonant phased array may be considered as the reference phase. The process of combining the power content of each of the phase compensated voltages results in high efficiency of the power transmission. The combined power is used for the target device battery recharging.

In accordance with another embodiment of the present invention a safety mechanism is built into the power delivery system to cutoff the power delivery when a living/moving object interferes with the power delivery path close to the focal point. The power delivery process is resumed after an arbitrary small amount of time sensing the exit of the living/moving object from the path of the power delivery.

Figure 1:
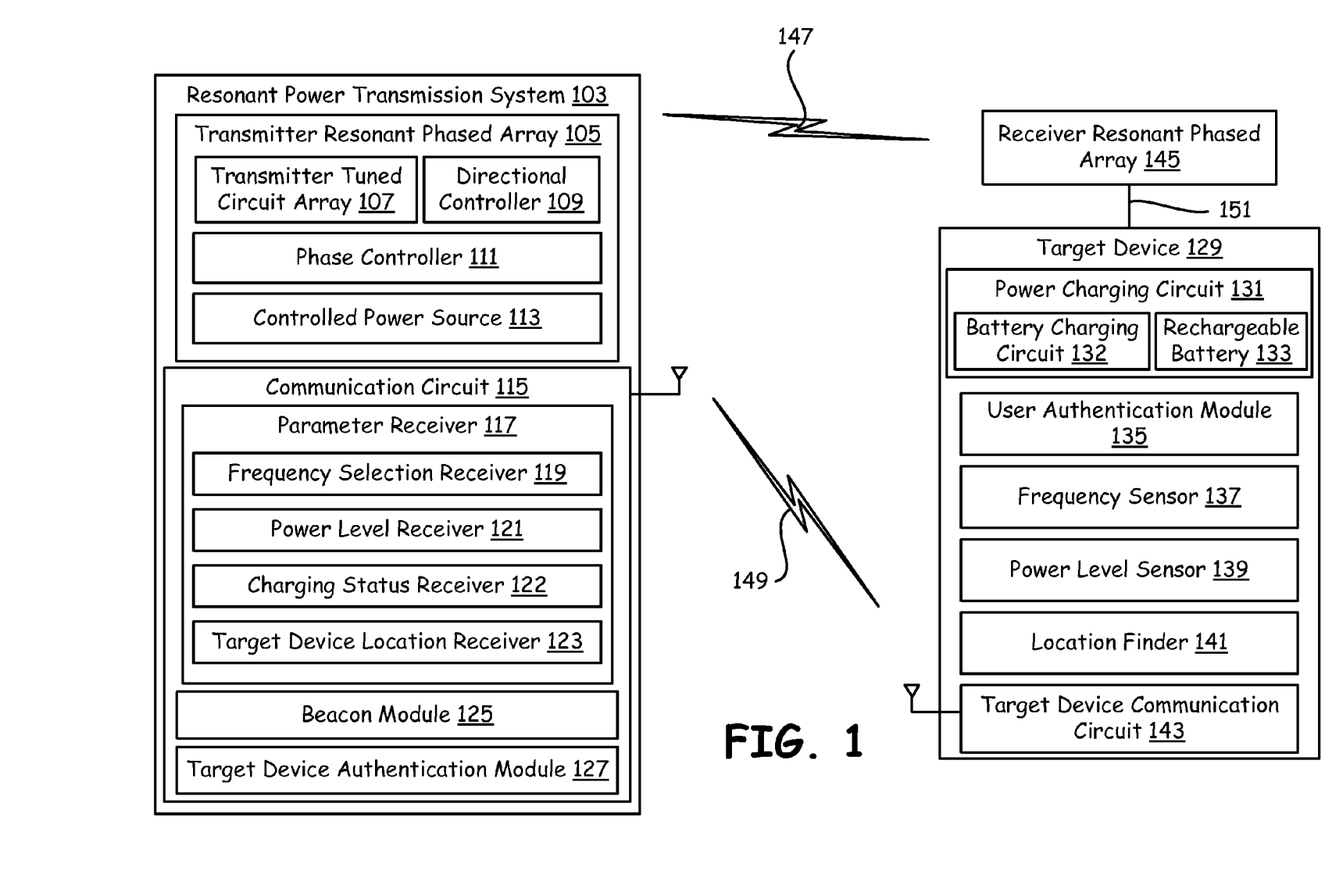
FIG. 1 is a block diagram illustrating a resonant power transmission system that wirelessly delivers power to a target device in accordance with one or more embodiments of the present invention.

FIG. 1 is a block diagram illustrating a resonant power transmission system that wirelessly delivers power to a target device in accordance with one or more embodiments of the present invention. The resonant power transmission system 103 sends a beacon signal at regular interval on a communication channel 149, particularly target device 129. In response to the beacon signal the target device 129 sends a request for wireless power delivery. The resonant power transmission system 103 identifies the target device, authenticates the target device for power delivery, and wirelessly delivers power to the target device 129 when the target device is authenticated. After power delivery commences, the delivery is constantly monitored in closed loop. The closed loop operation ensures power delivery operation at an optimum coupling, right power level, and at a right frequency. Any deviations in these parameters are communicated by target device 129 to the resonant power transmission system 103 and alteration in operation may be commenced.

The resonant power transmission system 103 includes a transmitter resonant phased array 105 and a communication circuit 115 and is operable to wirelessly deliver electric power to the target device 129 and to communicate with the target device 129. The transmitter resonant phased array 105 includes a controlled power source 113, a plurality of transmitting elements, a plurality of transmitter tuned circuit elements, and control circuitry. The power source, embodied as a controlled power source 113 in FIG. 1, is operable to source alternating current power at a target frequency. The plurality of transmitting elements, included in the transmitter tuned circuit array 107 of FIG. 1, are each operable to produce a non-radiated magnetic field with the plurality of transmitting elements operable to produce a composite non-radiated magnetic field 147. The plurality of transmitter tuned circuit elements, also included in the transmitter tuned circuit array 107 of FIG. 1, are operable to couple the alternating current power to the plurality of transmitting elements. The control circuitry, embodied as directional controller 109 and/or phase controller 111 of FIG. 1, are operable to control the transmitter tuned circuit array to direct the composite non-radiated magnetic field 147 toward the target device 149.

In some embodiments, as will be illustrated further in the FIGs. and described further with reference thereto may include a plurality of coils. In such embodiments, the control circuitry (phase controller 111) is operable to control the plurality of tuned circuit elements to individually control phase of the non-radiated magnetic fields produced by the plurality of transmitting elements to control directionality of the composite non-radiated magnetic field 147 by controlling phase of such non-radiated magnetic fields. The control circuitry is operable to receive feedback from the target device 129 via the communication circuitry 115 that is used to direct the composite non-radiated magnetic field 147. In some embodiments, the plurality of tuned circuit elements comprise lumped circuit elements whose elemental values are controllably varied by the control circuitry to control phase of the non-radiated magnetic fields produced by the plurality of transmitting elements.

As will be described further with reference to FIG. 2, the plurality of transmitting elements may be arranged in an array. This array may be configured any many differing manners. For example, if the array is mounted in a ceiling or floor, the array may be parallel to the ceiling or floor so that the non-radiated magnetic fields are directed toward a room below (or above). With the array mounted in a kiosk or other structure, the array may be mounted so that the non-radiated magnetic fields are directed towards an area in which target devices are located that will receive power. In some embodiments, the array is mechanically actuated with the resonant power transmission system further including a directional controller for physically controlling orientation of the plurality of transmitting elements (coils, antennas, etc.). The control circuitry may be further operable to dynamically select the target frequency.

The transmitter tuned circuit array 107 may consist of an array of tuned circuits that are controllable. Each of the tuned circuits may be a combination of a coil and a capacitor. The resonating action of the tuned circuit maximizes directional coupling with the target device. The directional controller may 109 orient the energy produced by coils of the tuned circuits so that the composite field is directed toward a common point of a target device 129 location called "the magnetic focal point." At the magnetic focal point the coupling field becomes a maximum. The magnetic field setup by the plurality of the coils by the resonant action is called the resonant field pattern. In some embodiments, the directionality of the coils is physical, i.e., they may be directed via physical means. In other embodiments, the physical position of the coils is fixed.

The phase controller 111 has the functionality of controlling the phase of the field pattern from each of the coils fed to a magnetic focal point. The phase adjustments are done for accounting the path difference experienced by different tuned circuit field patterns in reaching the magnetic focal point. This will ensure constructive interference of the magnetic field components from different tuned circuits (or coils) at the magnetic focal point.

The phase controller 111 may execute an optimizer algorithm based upon feedback from the target device 129 that may be based on the received power level of the target device 129. The power level information received by the resonant power transmission system 103 triggers the execution of the algorithm to maximize the magnetic field pattern at the magnetic focal point, which will be communicated by the target device to the resonant power transmission system 103.

During the magnetic field pattern maximization algorithm execution the phase controller 111 is controlled in such a way that it keeps adjusting the signal phase in a progressive steps in either positive or negative direction to compensate for the path difference. The central coil element of the array is considered as the reference for the phase control with respect which each signal phases from other coils are adjusted. The direction of the phase adjustment is done based on the relative position of the coil in the array and also based on the position of the magnetic focal point in the space.

Another parameter of interest to control is the power level. After maximizing the magnetic field intensity at the magnetic focal point with respect to phase difference and direction, the field intensity can be further varied by the power level variation of the controlled power source 113. The power from the controlled power source 113 is fed to a power divider diving power equally into many ports with number of ports equal to the number of the coils. The power level for each of the tuned circuit is adjusted by a plurality of the power amplifiers providing the required power gain.

The magnetic fields due to a plurality of the resonant coils are superimposed in the space whose phases are adjusted for a constructive interference. The field pattern at the magnetic focal point is called the resonant magnetic pattern in accordance with the present invention.

The communication circuit 115 has a parameter receiver 117, beacon module 125, and target device authentication module 127. The communication circuit 115 does the coordinating and feedback functionality between resonant power transmission system 103 and a target device 129.

The coordinating functionality includes the sending of the beacon signal, exchange of the authentication information, power request, target device location information, billing information, etc. The feedback information includes the receiving of target device received power level, frequency, charging time, etc. The coordination information and the feedback information are exchanged on a separate (common) channel 149. The power delivery is done on a separate channel 147 in the form of magnetic field coupling with the receiver resonant phased array 145. The receiver resonant phased array is connected with the target device 129. The received power is delivered to the target device 129 using a power cord 151. The channel 147 setups a resonant magnetic field pattern directed in the direction of the target device 129.

The parameter receiver 117 of the communication circuit 115 receives feedback from the target device 129. The feedback parameters of interest are power, frequency, charging status, and authentication information.

The frequency selection receiver 119 of the communication circuit 115 receives the frequency information from the target device 129 being tuned to. The power level receiver 121 receives the received power level by the target device 129. The received power level helps in transmitter resonant phased array coil orientation direction adjustment.

The charging status receiver 122 receives the charge status of the rechargeable battery within the target device 129. The target device location receiver 123 receives the target device 129 location in GPS coordinates at the regular time interval. If the target device is mobile, this is required to continuously track and transmits its location information.

The beacon module 125 continuously transmits the beacon signal indicative of the resonant power availability. In response to the beacon signal a target device will send power request signal and subsequent authentication. The target device authentication module 127 authenticates the power request made by the target device 129.

The receiver resonant phased array 145 is the part attached with the target device 129 using a power cord 151 or that is incorporated with the target device 129. The receiver resonant phased array ("RRPA") 145 receives the power from the magnetic field coupling. The components of 145 are described in FIG. 5. In receiving the power the coils of the RRPA 145 are tuned to resonate with the coupling resonant magnetic field.

The target device 129 is for e.g. a cell phone or a laptop computer having a power charging circuit 131, a user authentication module 135, a frequency sensor 137, a power level sensor 139, a location finder 141, and a target device communication circuit 143.

The power charging circuit 131 receives the power from the receiver resonant phased array 145 via the power cord 151 and converts into a form suitable for battery charging. It has the battery charging circuit 132 and a rechargeable battery 133. The battery charging circuit 132 converts the incoming power into DC (direct current) suitable for charging the rechargeable battery 133. The rechargeable battery 133 is the powering source for the entire operation of the target device 129.

The user authentication module 135 exchanges the target device identity and authentication information. For e.g. the user authentication module 135 in one embodiment can be a SIM card based identity provider.

The frequency sensor 137 senses the frequency of the coupling magnetic field pattern and sends it on the channel 149 to the resonant power transmission system 103. The power level sensor 139 senses the received charging power level by the target device 129 from the receiver resonant phased array 145. The location finder 141 sends the target device location to the resonant power transmission system 103.

The power level, frequency and location information are continuously transmitted from the target device 129 to the resonant power transmission system 103. This information is used by the direction controller 109 for positioning the magnetic focal point, by controlling the orientation of the coils, by phase controlling, and by the power level controlling. This is performed using the direction controller 109, power controller 111, and the controlled power source 113 respectively. These three modules control the respective parameters appropriately to maximize the coupled resonant magnetic field at the target device location or the magnetic focal point.

The target device communication circuit/module 143 has the functionality of gathering all the information that are sensed viz. frequency, power level and location information on the communication channel 149. Also the sent information from any other similar remote devices are similarly received and processed to initiate the expected actions.

Figure 2:
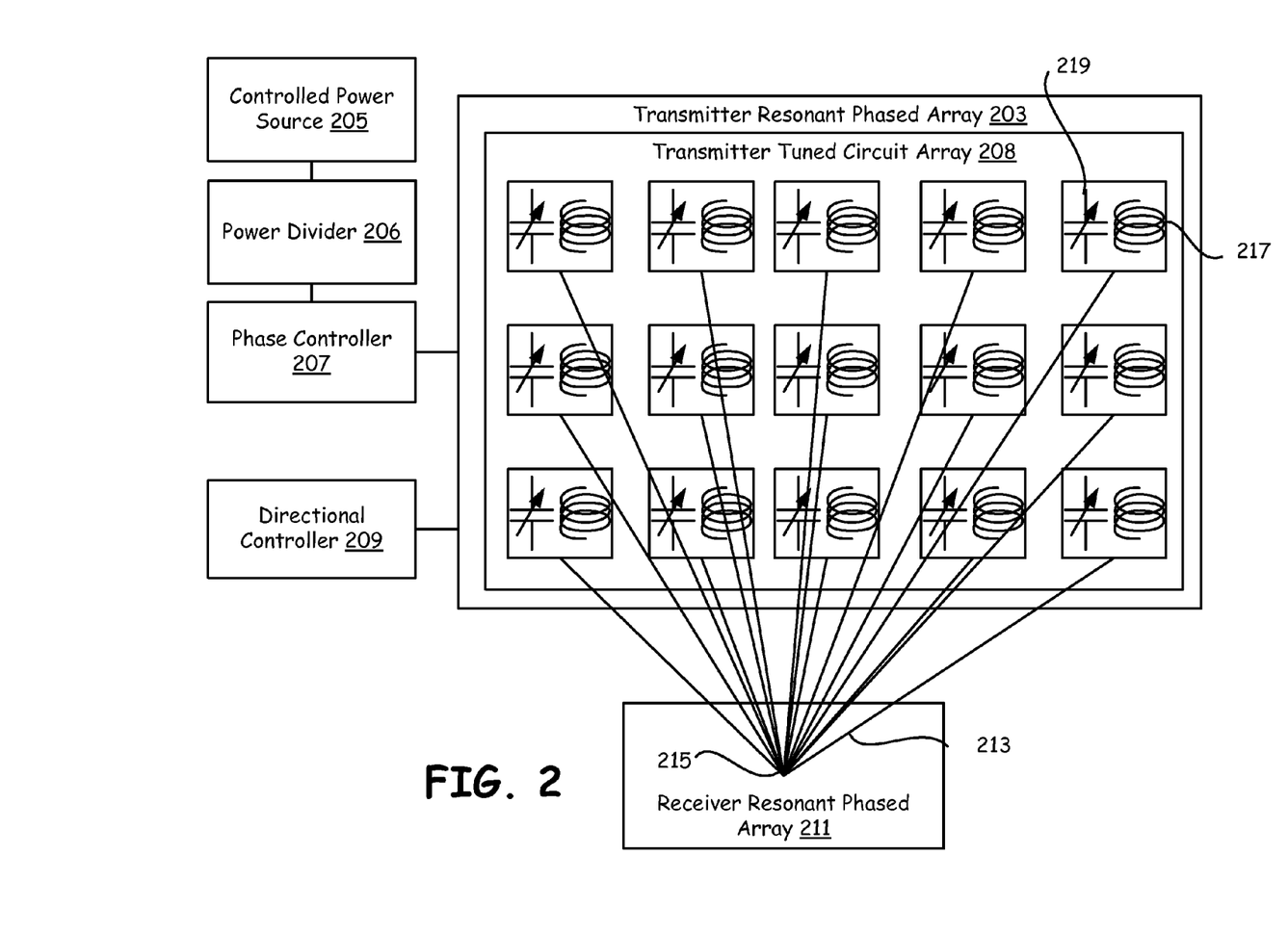
FIG. 2 is a block diagram illustrating an array of coils focusing their magnetic field lines to a target device location in accordance with one or more embodiments of the present invention.

FIG. 2 is a block diagram illustrating an array of coils focusing their magnetic field lines to a target device location in accordance with one or more embodiments of the present invention. The transmitter resonant phased array 203 has a plurality of coils in the form of an array. Each of the plurality of the coils is associated with plurality of capacitors. The spatial orientation of the plurality of the coils can be controlled using directional controller 209 in azimuth and elevation directions.

The controlled power source 205 output is fed to a power divider 206. The PD 206 split the signal power equally into number of output ports. The number of output ports is equal to the number of the tuned circuits in the array transmitter tuned circuit array 208. The power from the output of the power divider 206 is fed to the phase controller 207. The phase controller 207 adjusts the phase of the signals by exactly the same amount of the path difference at a distance magnetic focal point 215.

The direction controller 209 precisely controls the orientation of the coils so that the axis of the coils aligns with the line passing through the magnetic focal point 215. The line of sight is the line passing along the coil axis and the magnetic focal point 215. Thus the magnetic field is a maximum in such a line of sight orientation of the coil compared to any other arbitrary orientations of the coils with respect to the magnetic focal point 215.

Each of the plurality of the coils for e.g. 217 has an associated capacitor 219 that is a variable capacitor in some embodiments. When tuned to the signal power frequency the magnetic field at the magnetic focal point 215 is maximized. Further the phase adjustment by the phase controller 207 maximizes the magnetic field pattern at the magnetic focal point 215. This is done by adjusting phase of the magnetic field output by each of the coils 217. In other embodiments, the lumped circuit elements of each element in the array may be one or more switchable capacitors, one or more switchable inductors, one or more transistors, and/or one or more other circuit elements. In other embodiments, the phase controller 207 produces a plurality of variable phase signals to the plurality of coils such that component switching of the associated capacitors 219 may not be required. In still other embodiments, the capacitors 219 are controlled for resonance purposes based upon the dynamically adjustable target frequency for maximum power delivery to the target device 129.

The magnetic field pattern due to the plurality of the transmitter tuned circuit array 208 becomes a maximum at the magnetic focal point 215. This results in maximum vector addition of the resonant magnetic pattern due to the individual tuned circuits at the point of the target device location 215 called the magnetic focal point.

At the magnetic focal point 215 the receiver resonant phased array 211 is located linking the magnetic field lines and hence receiving the highest possible power as a result of the coherence or constructive interference achieved using controlled power source 205, phase controller 207, and the directional controller 209.

An array of tuned coils similar to that of the transmitter tuned circuit array 208 are tuned to the frequency of the magnetic field on the receiver resonant phased array 211. The voltages induced and hence the power received by each of the coils of the receiver resonant phased array 211 is combined to increase the efficiency of the method of the present invention.

Figure 3:
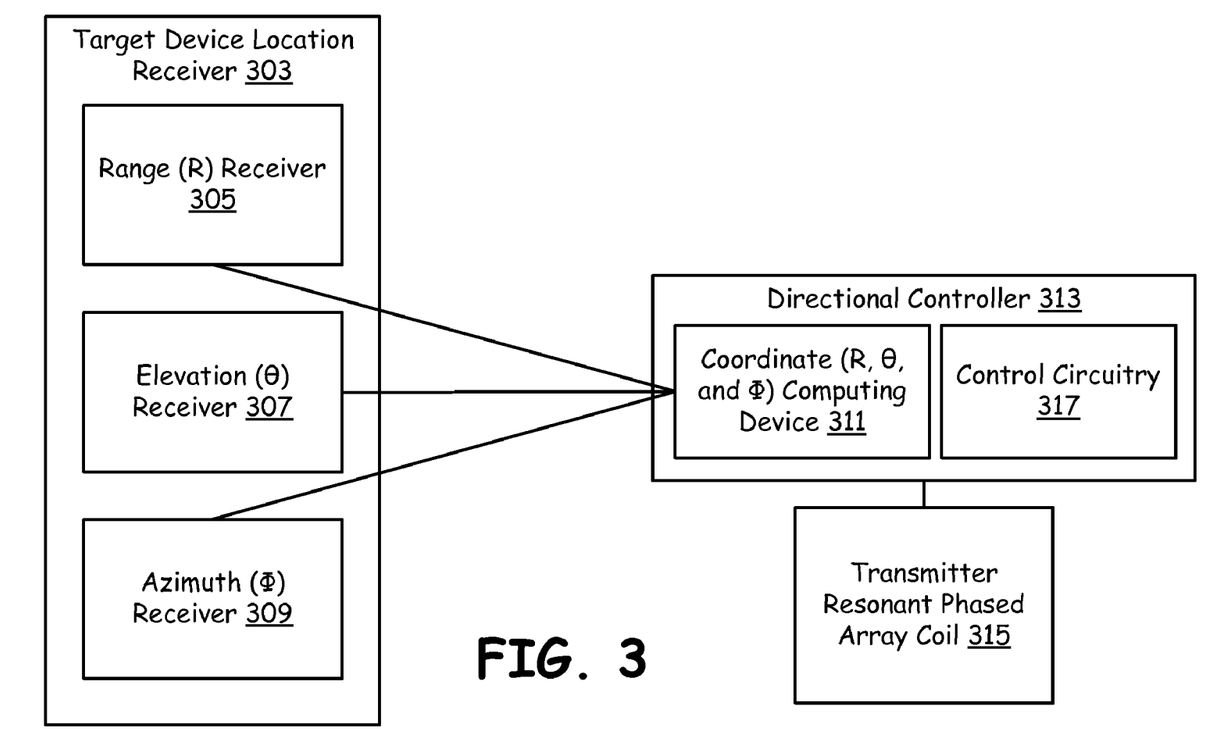
FIG. 3 is a block diagram of illustrating a portion of the phased array resonant power transmission system of FIG. 1 that is operable to calculate the location of the target device based on the received information to direct a magnetic field pattern in accordance with one or more embodiments of the present invention.

FIG. 3 is a block diagram of illustrating a portion of the phased array resonant power transmission system of FIG. 1 that is operable to calculate the location of the target device based on the received information to direct a magnetic field pattern in accordance with one or more embodiments of the present invention. The target device location receiver 303 receives the location information sent by the location finder 141 of FIG. 1. It extracts the range, elevation, and azimuth information of the target device location, for e.g. the magnetic focal point 215 of FIG. 2. The coordinate computing device 311 of the directional controller 313 uses this information and controls the coil orientation of the transmitter resonant phased array 105 of FIG. 1. The directional controller 313 can precisely control the stepper motors that control the elevation and the azimuth orientation of the coils at the finer steps.

In another embodiment of the present invention the target device need not send its location information. This information is computed by the coordinate computing device 311 based on the power request signal direction.

Figure 4:
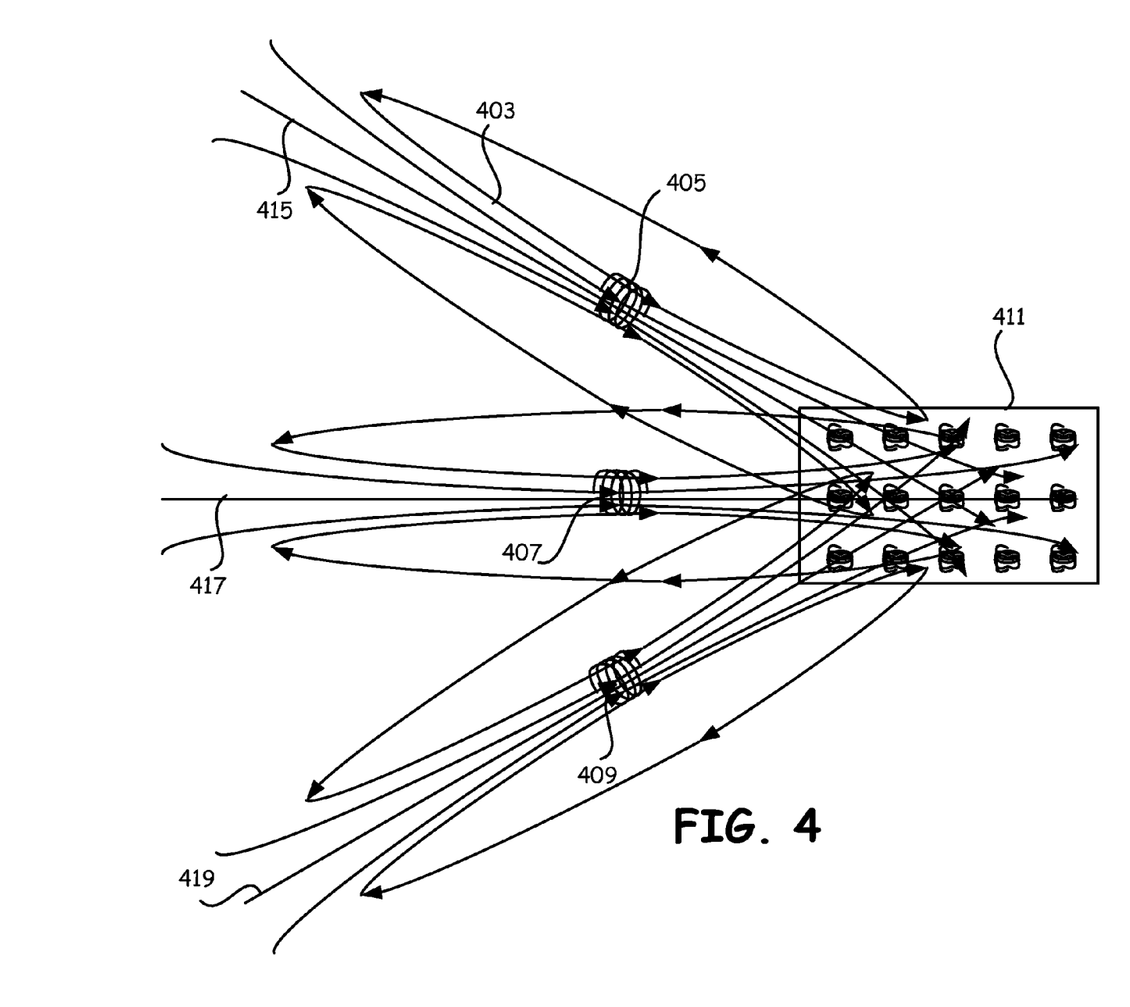
FIG. 4 is a perspective diagram illustrating approximate orientations of magnetic fields produced by a phased array resonant power transmission system the resonant coil in the resonant power transmission system and the receiver resonant phased array magnetically coupled showing the linking magnetic field lines during the resonant power delivery in accordance with one or more embodiments of the present invention.

FIG. 4 is a perspective diagram illustrating approximate orientations of magnetic fields produced by a phased array resonant power transmission system the resonant coil in the resonant power transmission system and the receiver resonant phased array magnetically coupled showing the linking magnetic field lines during the resonant power delivery in accordance with one or more embodiments of the present invention. In the exemplary configuration of the resonating magnetic field pattern coupling 3 coils 405, 407, and 409 are physically (or operationally in other embodiments) oriented in such way that the line of sight passing along their axis passes through a common magnetic focal point (215 of FIG. 2).

As the magnetic field lines are in the closed loop form those magnetic field lines emanating along the coil axis takes longest path to complete their loop, thus achieving power delivery at the longest distance.

All the magnetic field lines such as 415, 417, and 419 meet at the magnetic focal point 215 of FIG. 2. The interference of all the magnetic field lines 415, 417, and 419 intensifies the magnetic field pattern at the location of the target device 129 at the point 215 of FIG. 2. The receiver resonant phased array 411 intercepts maximum magnetic field lines resulting in a maximum power delivery.

Figure 5:
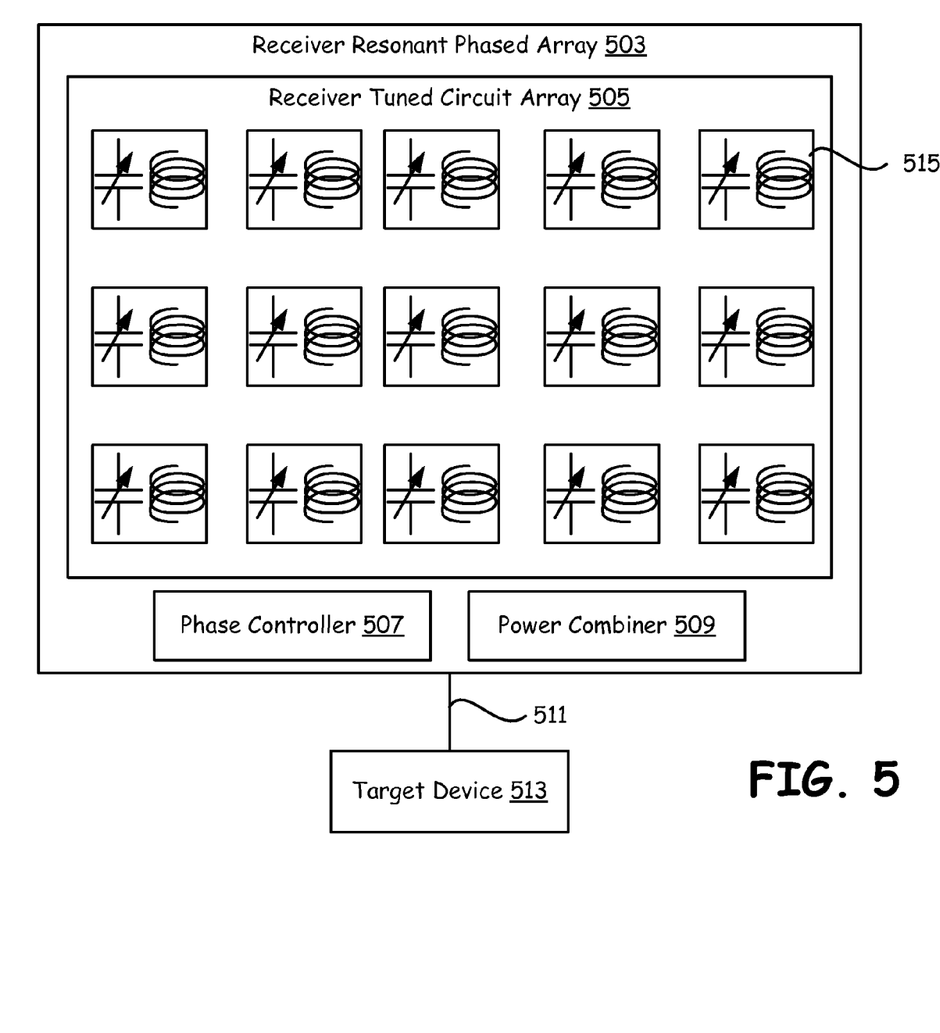
FIG. 5 is a block diagram illustrating a receiver resonant phased array connected to (or incorporated with) a target device with each of a plurality of tuned circuits having a coil and a capacitor resonating at a coupled magnetic field frequency in accordance with one or more embodiments of the present invention.

FIG. 5 is a block diagram illustrating a receiver resonant phased array connected to (or incorporated with) a target device with each of a plurality of tuned circuits having a coil and a capacitor resonating at a coupled magnetic field frequency in accordance with one or more embodiments of the present invention. The receiver resonant phased array 503 contains an array of receiver tuned circuit array 505, a phase controller 507, and a power combiner 509. The receiver resonant phased array 503 is associated with a power cord 511. One end of the power cord is attached with the receiver resonant phased array 503 and the other end fits into the power socket of the target device 513.

The receiver tuned circuit array 505 contains a plurality of the tuned circuits arranged in the form of a regular array. Each of the tuned circuits is a combination of a capacitor and a receiving coil. In one embodiment of the present invention there is a mechanism that can orient each of the plurality of coils so that there axis aligns with the line of sight of the transmitting coils of the transmitter resonant phased array 203 of FIG. 2.

A power combiner 509 receives all the received and phase compensated signals and combine them together. The power combiner has multiple input ports, and an output port. Signals inputted from the plurality of the input ports are combined and will be outputted in the output port.

The output of the power combiner 509 is connected to the one end of the power cord 511. The other end of the power cord 511 is plugged into the power socket of the target device 513. The power cord 511 is an impedance matched (to the ports) power cable with the required characteristic impedance. It also needs to be lossless for an efficient power transmission.

Figure 6:
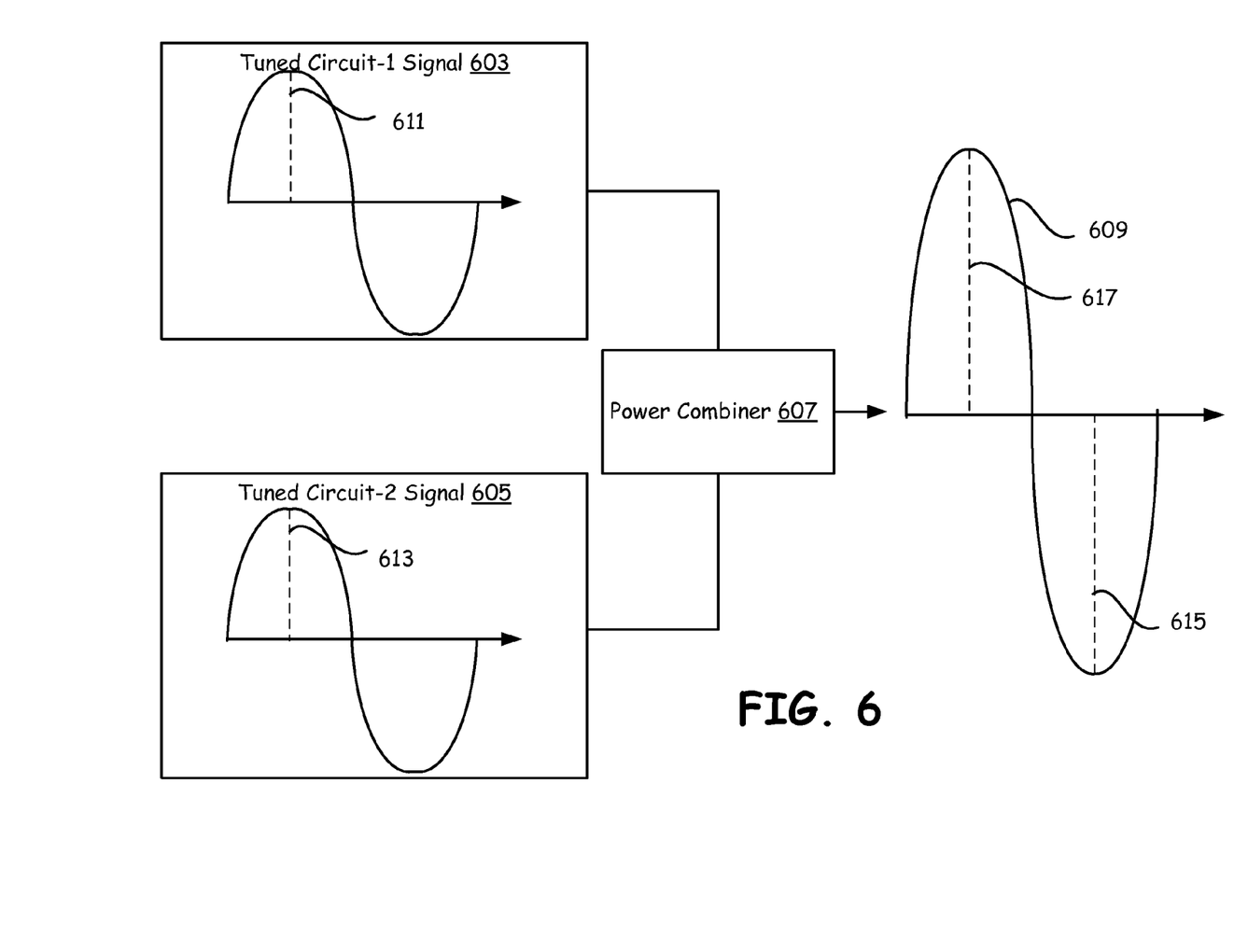
FIG. 6 is an illustration of superposition of two signals from two separate tuned circuits of the receiver resonant phased array; a similar superposition or a spatial constructive magnetic field interference (as vector addition) takes place at the magnetic focal point in accordance with one or more embodiments of the present invention.

FIG. 6 is an illustration of superposition of two signals from two separate tuned circuits of the receiver resonant phased array; a similar superposition or a spatial constructive magnetic field interference (as vector addition) takes place at the magnetic focal point in accordance with one or more embodiments of the present invention. The constructive interference of either the magnetic field or the voltages is will add multiple time varying voltage (phasors) or magnetic fields (vectors) of same frequency together resulting in a single large amplitude of the same frequency.

Adding or combining two signals of same frequency the resultant signal will have its maximum amplitude only when the phases of the two signals are of same value. The same rule applies for combining multiple signals of the same frequency. This is because when the phases are same the amplitude of each of the signals can be directly added instead of looking it as a phasor addition.

The principle of combining multiple signals is similar to the addition of two signals of FIG. 6, whether the addition is on wires or in free space. Looking at the addition of the fields in the space, it is vector addition of multiple field components about a point. The magnitude of the two vectors maximizes when the angle between the two vectors tends to be minimum or zero. Thus the orientation of the plurality of the transmitter coils is very much of the concern in enhancing the efficiency of the resonant power transmission.

In FIG. 6 two sinusoidal signals of same frequency from two tuned circuits of the receiver tuned circuit array 505 of FIG. 5 such as tuned circuit-1 signal 603 and tuned circuit-2 signal 605 are combined in the power combiner 607. The resulting output of the combination of the two signals 603 and 605 is the sinusoidal signal 609. The amplitude 611 of the signal 603 is ideally the same as the amplitude 613 of the signal 605. These signals in general are magnetic field in the space (at the magnetic focal point) or the corresponding voltages at the two inputs of the power combiner. The amplitude of the resulting signal 609 is 617 will be a maximum of the sum of the two amplitudes viz. 611 and 613, only when the phases of the signals 603 and 605 are the same apart from their frequencies being the same. When the magnetic fields are added the angle between the fields lines also matters during the vector addition.

In order to maximize the received voltage for the battery recharging there are few knobs for fine tuning, which will be done automatically in the present invention by executing some optimization algorithms in the resonant power transmission system 103 of FIG. 1. The control knobs (or parameters) are i) the phases of the signal fed to each of the plurality of the transmission resonant tuned circuits at the resonant power transmission system 103, ii) the spatial orientation control of the resonating coils of the transmitter resonant phased array 203 of FIG. 2, iii) the precise placement of the magnetic focal point right over the receiver resonant phased array 503 of FIG. 5, iv) in one embodiment of the present invention, the precise orientation of the receiving tuned coils are done to link maximum magnetic field for getting maximum induced voltage across the coil, v) the phase compensation of all the voltage signals induced across the plurality of the receiver tuned coils, and finally vi) the quality factor of the entire passive components that are involved in the signal/power transmission path from the controlled power source 111 of FIG. 1 till the rechargeable battery 133 terminal (of FIG. 1).

Figure 7:
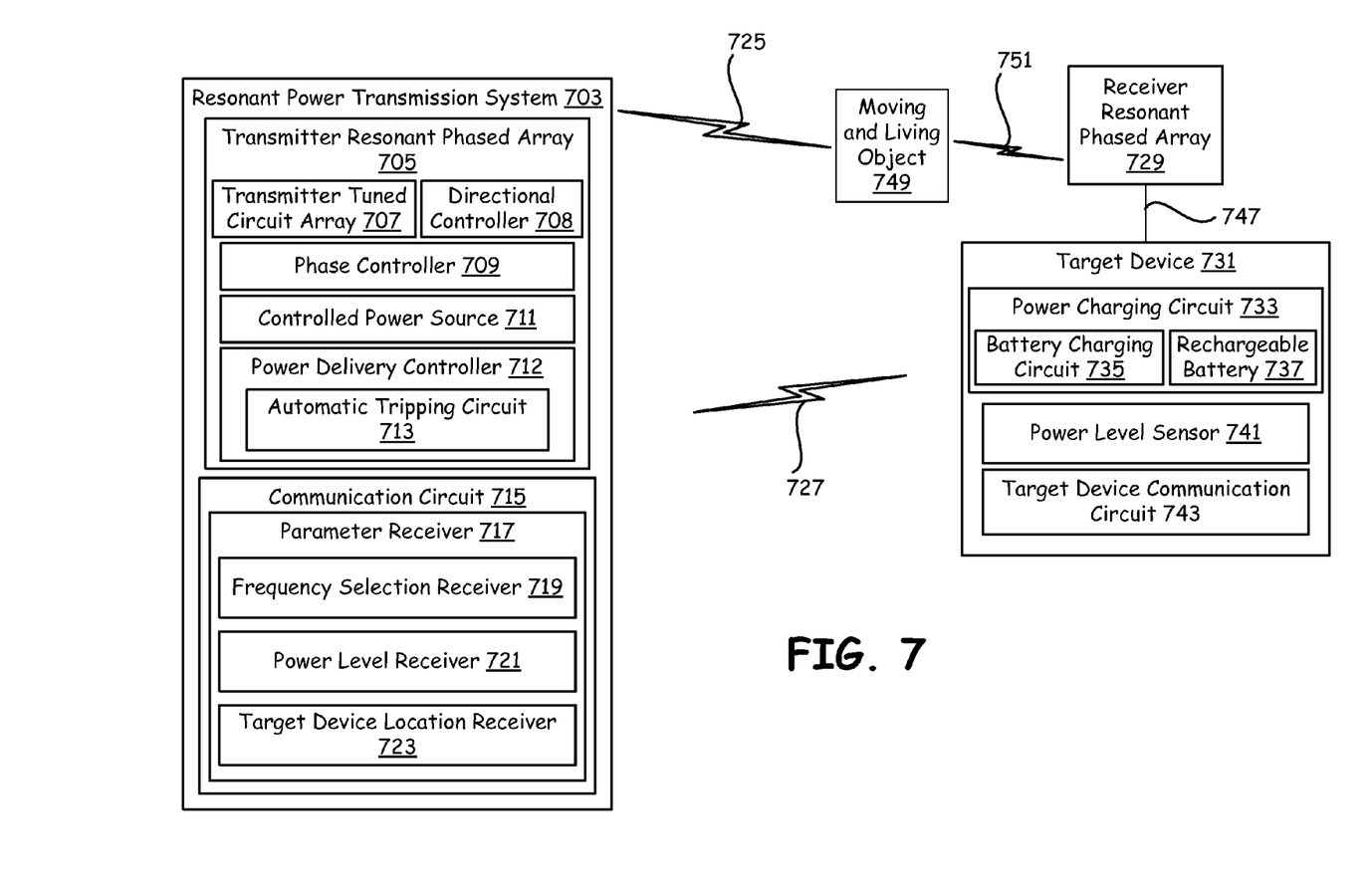
FIG. 7 is the system diagram illustrating automatic tripping components of a resonant power transmission system when a living body or a moving object receives a coupling magnetic field in accordance with one or more embodiments of the present invention.

FIG. 7 is the system diagram illustrating automatic tripping components of a resonant power transmission system when a living body or a moving object receives a coupling magnetic field in accordance with one or more embodiments of the present invention. The magnetic field intensity is a maximum in the magnetic focal point 215 of FIG. 2. This is because the magnetic filed from a plurality of the transmitter tuned circuits of FIG. 2 are interfering constructively. It is not advisable for any living object to interfere intentionally or unintentionally close to the magnetic focal point 215 of FIG. 2. This requires a safety mechanism built into the resonant power transmission system 103 of FIG. 1.

The safety mechanism built into the system is in the form of a tripping mechanism when once a moving/living object interferes in the path of the magnetic resonant coupling. This mechanism senses a sudden drop in the received power level as it is going to be reported by the target device 129 of FIG. 1. An embodiment that incorporates the safety mechanism into the resonant power transmission system is having an additional module called the power delivery controller 712 which controls the automatic tripping circuit 713.

The block of diagram of FIG. 7 has resonant power transmission system 703 and a target device 731 connected to a receiver resonant phased array 729. The resonant power transmission system 703 has the transmitter resonant phased array 705 and the communication circuit 715. The transmitter resonant phased array 705 consists of the transmitter tuned circuit array 707, the directional controller 708, the phase controller 709, the controlled power source 711, and a power delivery controller 712. The Power delivery controller 712 further comprises an automatic tripping circuit 713.

The power delivery controller is a logic circuit that decides among various options. One of the options according to the present in invention is the decision made during a sudden dropping of the received power level by the target device 731 (129 of FIG. 1 repeated). This can only happen during a normal course of the resonant power delivery when a moving/living object 749 suddenly comes on the path of power delivery scattering the magnetic field pattern 725 significantly. There will be significant scattering when the object comes closer to the magnetic focal point where the magnetic field intensity is high. Also those points around the magnetic focal point are ones where the hazard of high magnetic field intensity is expected.

Due to the significant field scattering close to the magnetic focal point the received power level suddenly drops. This is an indication of a moving/living object 749 in the path of the resonant power delivery. The drop in the power level is communicated by the target device 731 to the resonant power transmission system 703. The power delivery controller 712 quickly decides to cutoff power delivery for an arbitrary amount of time by actuating the automatic switching circuit 713. The resonant power transmission system 703 resumes the power delivery when once the power delivery controller 712 enables the power delivery. Subsequently the power delivery continues till any further interruptions or battery charge completion. It is a great concern for any living object coming on the path of the power delivery, compared to any nonliving (or moving) objects.

The magnetic field 725 is emanating from the transmitter resonant phased array 705 encounters scattering due to the moving/living object 749. As a result of the scattering most of the magnetic field is deviated in different paths not intercepting the receiver resonant phased array 729. The receiver resonant phased array 729 will only receive some minimum magnetic field 751 significantly less than what it would have received in the absence of the moving/living object 749 in the path of the magnetic field 725. As a result of the minimum coupling magnetic field only a small fraction of the maximum voltage will be induced in the coils of the receiver resonant phased array 729 and transmitted on the power cord 747 into the target device 731.

The communication circuit 715 of the resonant power transmission system 703 and target device communication circuit 743 of the target device 731 communicate with each other on the communication channel 727. The communication circuit 715 consists of the parameter receiver 717. The parameter receiver 717 has various other parameter receivers from the target device 731 such as frequency selection receiver 719, power level receiver 721, and the target device location receiver 723.

The target device 731 is indicated to have at least the power charging circuit 733 (131 of FIG. 1 repeated), the power level sensor 741, and the target device communication circuit 743. The power charging circuit 733 has the battery charging circuit 735 and the rechargeable battery 737.

Figure 8:
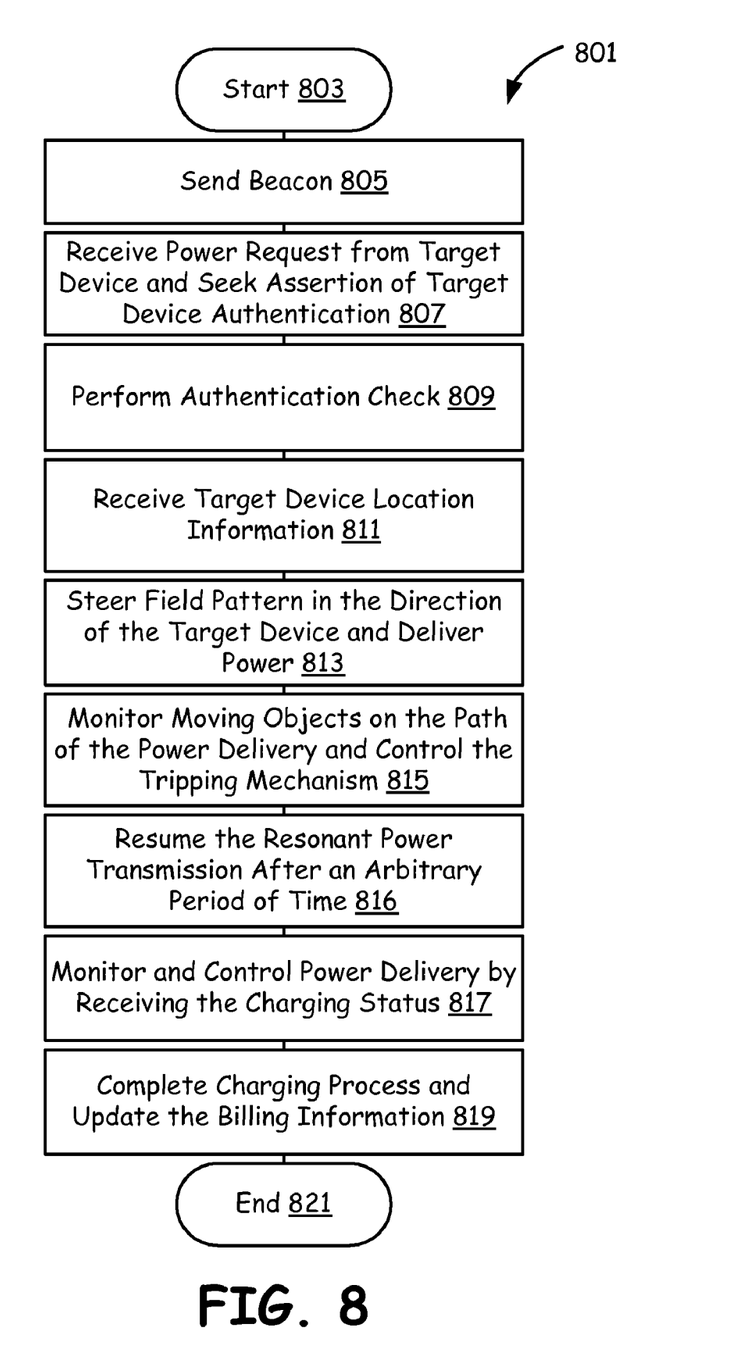
FIG. 8 is a flowchart illustrating operations performed by the resonant power transmission system of FIG. 1 during resonant power delivery operations in accordance with one or more embodiments of the present invention.

FIG. 8 is a flowchart illustrating operations 801 performed by the resonant power transmission system of FIG. 1 during resonant power delivery operations in accordance with one or more embodiments of the present invention. Starting at the block 803 the resonant power transmission system sends the beacon signal at the next block 805. In response to this beacon signal soliciting the resonant power delivery service the target devices within the range of the resonant power transmission system sends the power request.

In response to the request sent by the target device, the resonant power transmission system 103 of FIG. 1 seeks assertion of the target device authentication at the block 807. In response to this the target device sends its identity and its subscription details to the resonant power transmission system 103 of FIG. 1. At the next block 809 the resonant power transmission system authenticates the target device. In response to the authentication, the target device sends its location information in the form of the GPS coordinates of its location in one embodiment of the present invention. The resonant power transmission system 103 of FIG. 1 receives the target device information in the next block 811. In another embodiment of the present invention the resonant power transmission system computes the location of the target device based on the power request signal arrival direction information.

In response to receiving the target device location information sent by the target device, the resonant power transmission system steers the magnetic field pattern in the direction of the target device and starts delivering the resonant power to the target device at the block 813. The resonant power transmission system 103 of FIG. 1 continues to delivering the resonant power. During the process of resonant power delivery the resonant power transmission system 103 keeps monitoring the moving/living objects closed to the magnetic focal point and in case of any moving/living objects the resonant power transmission system controls a tripping mechanism to temporarily cutoff the power supply at the block 815. The activation of the tripping circuit is done based on the power level information sent by the target device at the regular interval. After an arbitrary period of time the power transmission is resumed at the next block 816.

The resonant power transmission system 103 of FIG. 1 continues to monitor the charging status of the rechargeable battery of the target device by receiving the charge status information sent by the target device at the block 817. This is required to cutoff the power transmission once the battery is fully charged. Subsequently the target device sends the total time of the charging operation which will be used to update the billing information. This is done at the next block 819. The process of the resonant power delivery ends after a successful battery charging operation at the last block 821.

Figure 9:
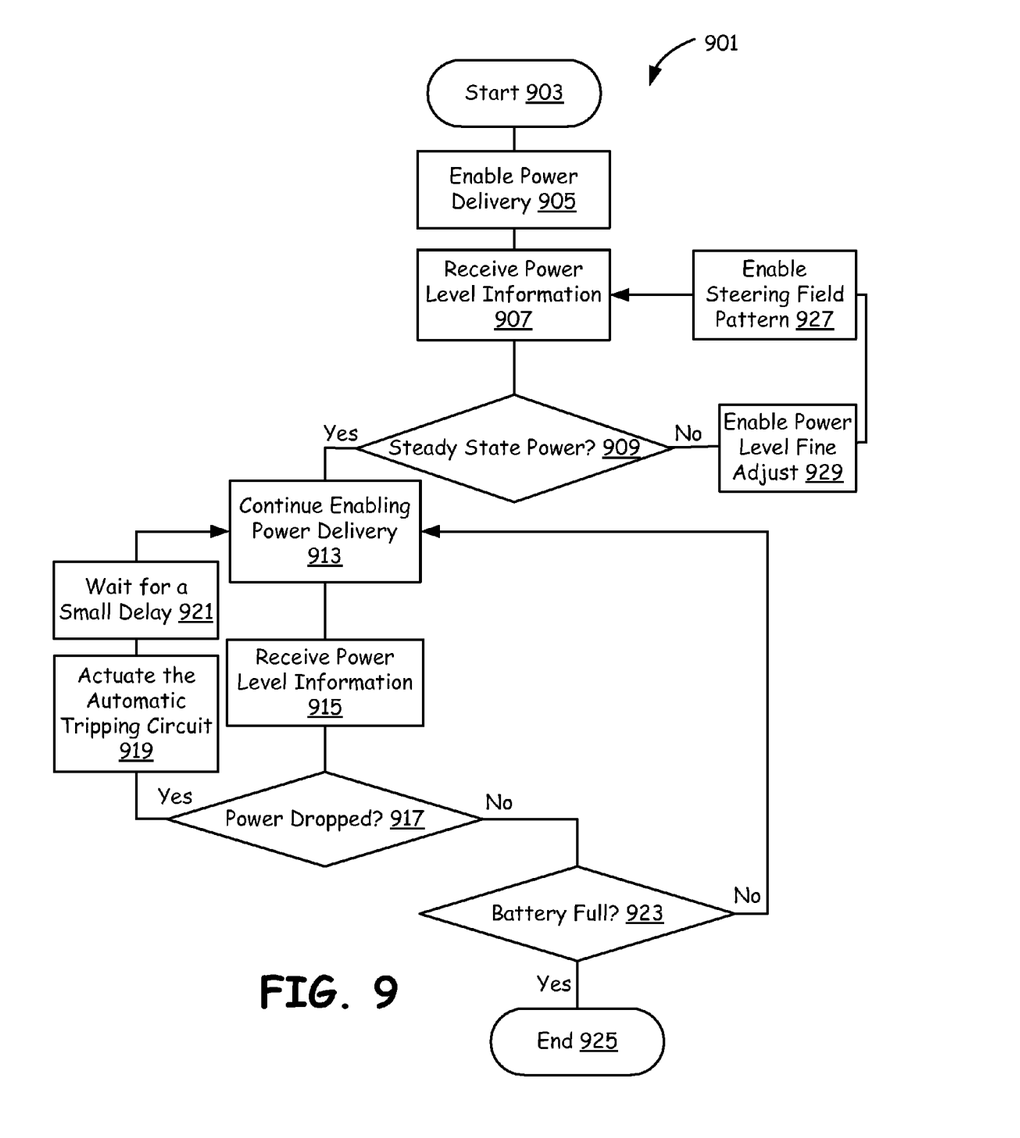
FIG. 9 is a flowchart illustrating operations performed by a power delivery controller of the resonant power transmission system of FIG. 1 when a moving object interferes on the path of the resonant magnetic pattern in accordance with one or more embodiments of the present invention.

FIG. 9 is a flowchart illustrating operations 901 performed by a power delivery controller of the resonant power transmission system of FIG. 1 when a moving object interferes on the path of the resonant magnetic pattern in accordance with one or more embodiments of the present invention. Starting the block 903 the power delivery controller 712 of FIG. 7 enables the power delivery to the target device at the block 905. The power delivery is initiated subsequently by the resonant power transmission system 103 of FIG. 1. In response to the power delivered by the resonant power transmission system 103 the target device sends 907 the received power level information back to the resonant power transmission system 103 of FIG. 1.

During the initiation of the power delivery, the receiving power will not be the maximum power level as the magnetic field maximization is required using the coils direction orientation, and the phase controlling of the signal along the path of power delivery. Gradually over a small period of time, the received power level reaches its steady state maximum value.

At the decision block 909 the power delivery controller tests whether the resonant power delivery is done at the steady state value. If the test returns false at the block 909, the power delivery controller goes to the block 929, where it will enable the power level by a finer adjustments using the signal amplifier gain control and by the phase controlling of signal phase. Operation returns to block 927 where it fine tunes or optimally orients the transmitter resonant phased array coils to maximize the power delivered to the magnetic focal point 215 of the FIG. 2. From the block 927 the power delivery controller 712 goes back to the state 907.

If the tests in the decision block 909 returns true, the power delivery controller goes to the state 913 continuing to enable the resonant power delivery. Subsequently the power delivery controller receives the power level information sent by the target device at the block 915. At the next decision block 917 it is tested to see whether the power level dropped significantly.

If the test performed at the block 917 returns true the power delivery controller 712 actuate the automatic tripping circuit at the block 919, and subsequently at the block 921 the power delivery controller enters a predetermined amount of wait state and goes back to enable the power delivery at the block 913.

If the test in the decision block 917 returns false then at the next decision block 923 the power delivery controller tests whether the battery is charged fully. If the test returns true the process of power delivery is ended in the last block 925, else the power delivery controller 712 control goes back to the previous block 913 to continue enabling the power delivery.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A resonant power transmission system for wirelessly delivering electric power to a target device, the resonant power transmission system comprising:
   a transmitter resonant phased array comprising:
      a power source operable to source alternating current power at a target frequency;
      a plurality of transmitting elements, each operable to produce a non-radiated magnetic field, the plurality of transmitting elements operable to produce a composite non-radiated magnetic field;
      a plurality of transmitter tuned circuit elements operable to couple the alternating current power to the plurality of transmitting elements; and control circuitry operable to control the plurality of transmitter tuned circuit elements to direct the composite non-radiated magnetic field toward the target device; and a communication circuit operable to communicate with the target device.

2. The resonant power transmission system of claim 1, wherein:

the plurality of transmitting elements comprise a plurality of coils; and the control circuitry is operable to individually control phase of the non-radiated magnetic fields produced by the plurality of transmitting elements by control of the plurality of transmitter tuned circuit elements.

3. The resonant power transmission system of claim 1, wherein the control circuitry is operable to receive feedback from the target device via the communication circuitry that is used to direct the composite non-radiated magnetic field.

4. The resonant power transmission system of claim 1, wherein at least some of the plurality of transmitter tuned circuit elements comprise lumped circuit elements.

5. The resonant power transmission system of claim 1, wherein the plurality of transmitting elements are arranged in an array.

6. The resonant power transmission system of claim 1, further comprising a target device authentication module for authentication of the target device for wireless power delivery.

7. The resonant power transmission system of claim 1, further comprising a frequency selection controller for selecting the target frequency.

8. The resonant power transmission system of claim 1, further comprising a beacon module operable to transmit via the communication circuit a beacon regarding wireless power delivery.

9. The resonant power transmission system of claim 1, further comprising a directional controller for physically controlling orientation of the plurality of transmitting elements.

10. The resonant power transmission system of claim 1, wherein the control circuitry is further operable to dynamically select the target frequency.

11. A method for wirelessly delivering electric power to a target device, the method comprising:

sourcing alternating current power at a target frequency;

coupling the alternating current power to a plurality of transmitting elements to produce a non-radiated magnetic field by each of the plurality of transmitting elements, the plurality of non-radiated magnetic fields producing a composite non-radiated magnetic field;

controlling the non-radiated magnetic fields produced by the plurality of transmitting elements to direct the composite non-radiated magnetic field toward the target device; and communicating with the target device.

12. The method of claim 11, wherein controlling the non-radiated magnetic fields produced by the plurality of transmitting elements to direct the composite non-radiated magnetic field toward the target device comprises individually controlling phase of alternating current power provided to at least some of the plurality of transmitting elements.

13. The method of claim 11, wherein controlling the non-radiated magnetic fields produced by the plurality of transmitting elements to direct the composite non-radiated magnetic field toward the target device comprises controlling a plurality of transmitter tuned circuit elements respectively associated with the plurality of transmitting elements.

14. The method of claim 13, wherein controlling a plurality of transmitter tuned circuit elements respectively associated with the plurality of transmitting elements comprises altering lumped tuning element settings of the plurality of transmitter tuned circuit elements.

15. The method of claim 11, further comprising:

receiving feedback from the target device; and using the feedback to direct the composite non-radiated magnetic field.

16. The method of claim 11, further comprising authenticating the target device for wireless power delivery.

17. The method of claim 11, selecting the target frequency to facilitate transfer of power.

18. The method of claim 17, wherein selecting the target frequency comprises selecting the target frequency based upon feedback received from the target device.

19. The method of claim 11, further comprising wirelessly transmitting a beacon regarding wireless power delivery.

20. The method of claim 11, wherein controlling the non-radiated magnetic fields produced by the plurality of transmitting elements to direct the composite non-radiated magnetic field toward the target device comprises physically controlling orientation of the plurality of transmitting elements.

* * * * *